United States Patent [19]

Teramachi

[11] Patent Number: 4,527,842
[45] Date of Patent: Jul. 9, 1985

[54] CONSTRUCTION FOR ADJUSTING CLEARANCE IN LINEAR SLIDE BEARING

[76] Inventor: Hiroshi Teramachi, 2-34-8, Higashi-Tamagawa, Setagaya-Ku, Tokyo, Japan

[21] Appl. No.: 614,900

[22] Filed: May 29, 1984

[30] Foreign Application Priority Data

May 30, 1983 [JP] Japan .................................. 58-95481

[51] Int. Cl.$^3$ ............................................. F16C 29/06
[52] U.S. Cl. ................................................. 308/6 C
[58] Field of Search ..................... 308/6 C, 6 R, 6 A; 464/168

[56] References Cited

U.S. PATENT DOCUMENTS

| 3,560,061 | 2/1971 | Shaw | 308/6 C |
| 3,933,396 | 1/1976 | Nilsson | 308/6 C |
| 4,376,557 | 3/1983 | Teramachi | 308/6 C |
| 4,417,771 | 11/1983 | Teramachi | 308/6 C |

Primary Examiner—Lenard A. Footland
Attorney, Agent, or Firm—Armstrong, Nikaido, Marmelstein & Kubovcik

[57] ABSTRACT

A construction for adjusting the clearance between the sliding block and the track shaft of a linear slide bearing, so as to adequately preload the load-carrying balls of the bearing while smoothing the running of the balls when the balls roll into and out of the loaded ball passages of the bearing. The construction for adjusting the clearance comprises: a pair of mounting surfaces formed on the top of the horizontal portion of the sliding block above the sleeve portions and extending longitudinally of the sliding block; a carrier mounted on the mounting surfaces and fastened by a plurality of fastening bolts such that a gap is left between the upper surface of the central portion of the horizontal portion of the sliding block and the opposing lower surface of the carrier; and at least one clearance adjusting bolt extending through the carrier and acting on the midportion of the horizontal portion of the sliding block between the mounting surfaces; whereby the horizontal portion of the sliding block is elastically deflected as the clearance adjusting bolt is tightened, so that the clearance between the inner surface of each sleeve portion of the sliding block and the opposing surface of the track shaft is adjusted as a result of the elastic deflection of the horizontal portion.

4 Claims, 14 Drawing Figures

CONSTRUCTION FOR ADJUSTING CLEARANCE IN LINEAR SLIDE BEARING

BACKGROUND OF THE INVENTION

The present invention relates broadly to a linear slide bearing for linearly guiding sliding parts such as those incorporated in NC lathes and other machine tools, industrial robots and so forth and, more particularly, to a construction for allowing an adjustment of the clearance between a track shaft and a sliding block constituting the linear slide bearing, thereby to suitably preload the load carrying balls between the track shaft and the sliding block or to smooth the running of these balls.

Generally, a linear slide bearing has a sliding block having a substantially inverted C-shaped cross-section with the lower side recessed to form a cavity which is adapted to receive the upper end portion of a shaft track with a suitable clearance held therebetween. The linear slide bearing further has a multiplicity of balls adapted to run along a plurality of endless ball passages formed in the sliding block. The balls carry the load applied to the sliding block in all directions, while guiding the linear reciprocating movement of the sliding block along the track shaft.

This type of linear slide bearing has to meet various requirements. For instance, this type of bearing has to be mounted in the sliding parts of ordinary industrial machines at a high precision, and to exhibit a high precision of positioning and reciprocation of the sliding parts, as well as a high durability. In order to meet these demands, it is necessary to keep, between the loaded ball groove in the sliding block and the loaded ball groove in the track shaft, a distance which is seemingly smaller than the diameter of the balls, thereby to preload the balls to ensure the uniform contact of all balls with the ball rolling surfaces of the loaded ball grooves, so as to eliminate any unfavourable effect such as the hammering action of the balls which may be caused by the inertia of the balls when they make a turn at each end of the loaded ball passage, and any twisting which may be caused by disorder of the balls. It is also necessary to provide suitable means for ensuring smooth running of the balls from the non-loaded region into the loaded region and vice versa.

For suitably preloading the balls, hitherto, such measures have been taken as to select the ball carefully so that the balls used in the bearing have strictly identical diameters. It has been also attempted to adjust the clearance between the sliding block and the track shaft by means of bolts which cooperate with slots formed in the sleeve portions of the sliding block.

On the other hand, it has been proposed to effect a so-called crowning, in which the loaded ball groove in the sliding block has a greater width at both its end portions than at its central portion, aiming at smoothing the running of the balls in the endless ball passage.

The careful selection of the balls, however, required an impractically long time and much-labor. In addition, since the selection of the balls and the adjustment of the clearance by adjusting means provided on the sliding block have to be made before the bearing is mounted in the sliding part of the machine, it is quite difficult to optimumly preload the balls in accordance with respective purposes of use of the bearing with these measures. The crowning, which requires a specifically high precision, is also quite troublesome and time consuming.

SUMMARY OF THE INVENTION

Accordingly, it is a primary object of the invention to provide an improved construction for adjusting the clearance in linear slide bearing, thereby to overcome the above-described problems of the prior art.

To this end, according to the invention, there is provided a construction for adjusting the clearance in a linear slide bearing of the type having a sliding block with a horizontal portion and a pair of sleeve portions extending downwardly from both lateral sides of the horizontal portion, the horizontal portion and the sleeve portions cooperating in defining a recess which opens downwardly, each of the sleeve portions being provided in the inner surface thereof with a longitudinal loaded ball groove and a non-loaded ball passage corresponding to the loaded ball passage, a track shaft having an upper portion received in the recess of the sliding block such that a predetermined clearance is left between the sliding block and the track shaft, a pair of end covers secured to both longitudinal ends of the sliding block, each end cover being provided in the inner surface thereof with so as to connect the loaded-ball grooves to corresponding non-loaded ball passages thereby to form endless ball passages, and a multiplicity of balls adapted to be circulated along the endless ball passages, the balls residing in the loaded ball passages constituted by the loaded ball grooves in the sliding block and the ball rolling grooves in the track shaft carrying the load applied to the sliding block, the clearance adjusting construction comprising: a pair of mounting surfaces formed on the top of the horizontal portion of the sliding block above the sleeve portions and extending longitudinally of the sliding block; a carrier mounted on the mounting surfaces and fastened by a plurality of fastening bolts such that a gap is left between the upper surface of the central portion of the horizontal portion of the sliding block and opposing lower surface of the carrier; and at least one clearance adjusting bolt extending through the carrier and acting on the mid portion of the horizontal portion of the sliding block between said mounting surfaces; whereby the horizontal portion of the sliding block is elastically deflected as the clearance adjusting bolt is tightened, so that the clearance between the inner surface of each sleeve portion of the sliding block and the opposing surface of the track shaft is adjusted as a result of the elastic deflection of the horizontal portion.

The above and other objects, features and the advantages of the invention will become clear from the following description when the same is read in conjunction with the accompanying drawings.

DESCRIPTION OF THE PREFERRED EMBODIMENT

Figure 1:
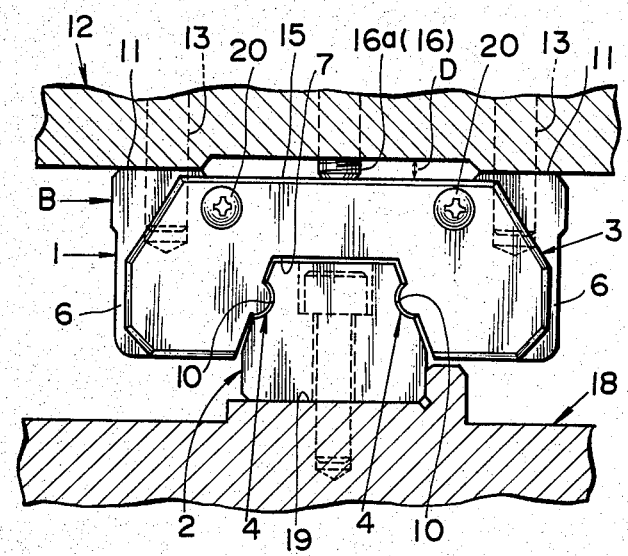
FIG. 1 is a front elevational view of a linear slide bearing in the mounted condition, incorporating the construction in accordance with the invention for adjusting the clearance between the track shaft and the sliding block.
Figure 2:
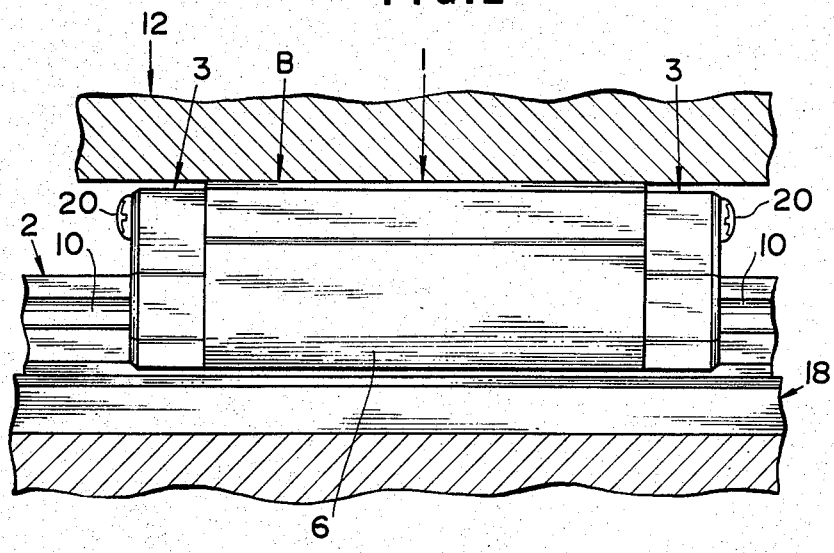
FIG. 2 is a side elevational view of the linear slide bearing shown in FIG. 1.
Figure 3:
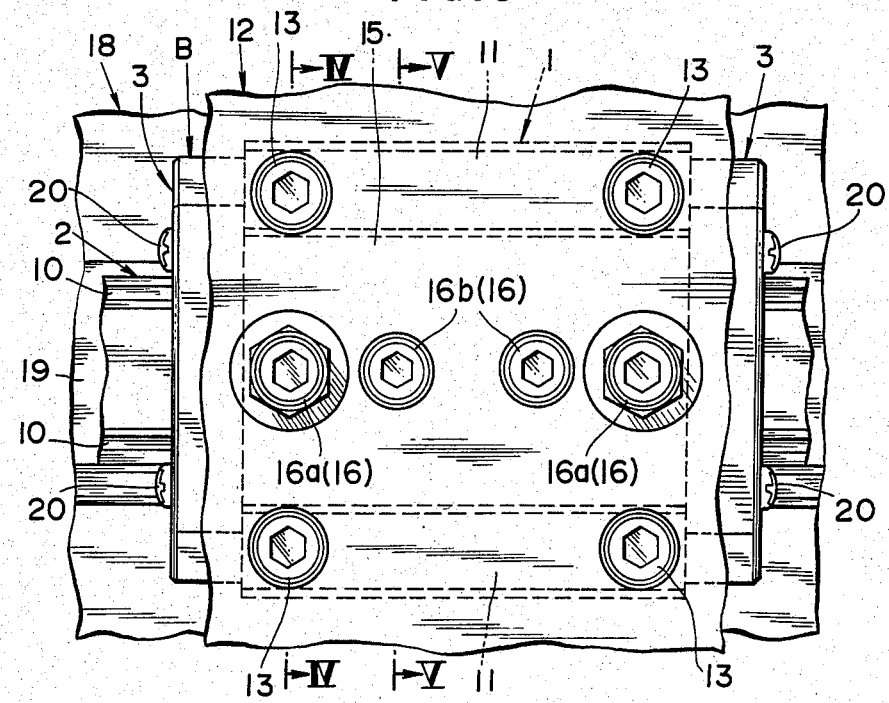
FIG. 3 is a plan view of the linear slide bearing shown in FIG. 1.
Figure 4:
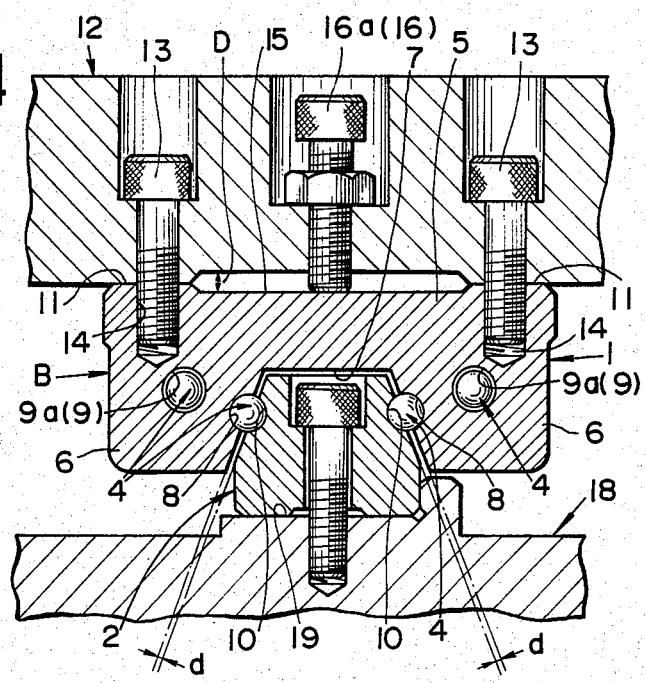
FIG. 4 is a sectional view taken along the line IV—IV of FIG. 3.
Figure 5:
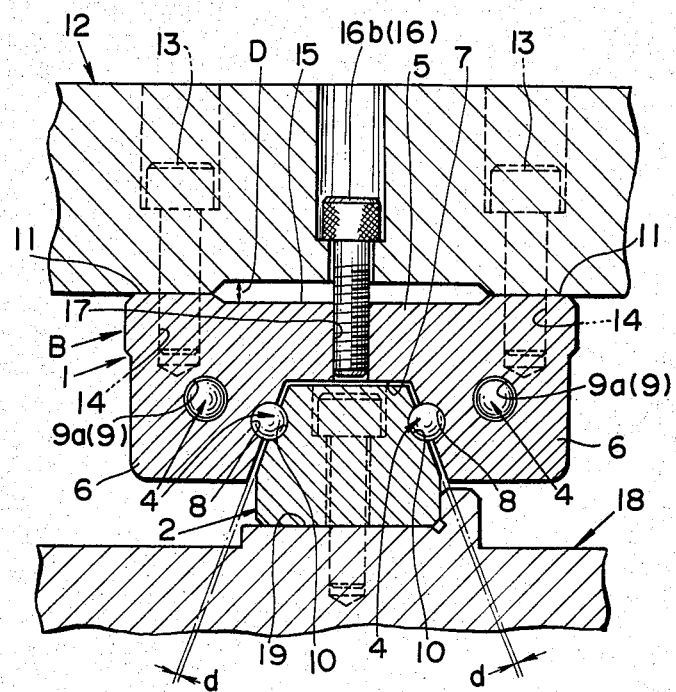
FIG. 5 is a sectional view taken along the line V—V of FIG. 3.
Figure 6:
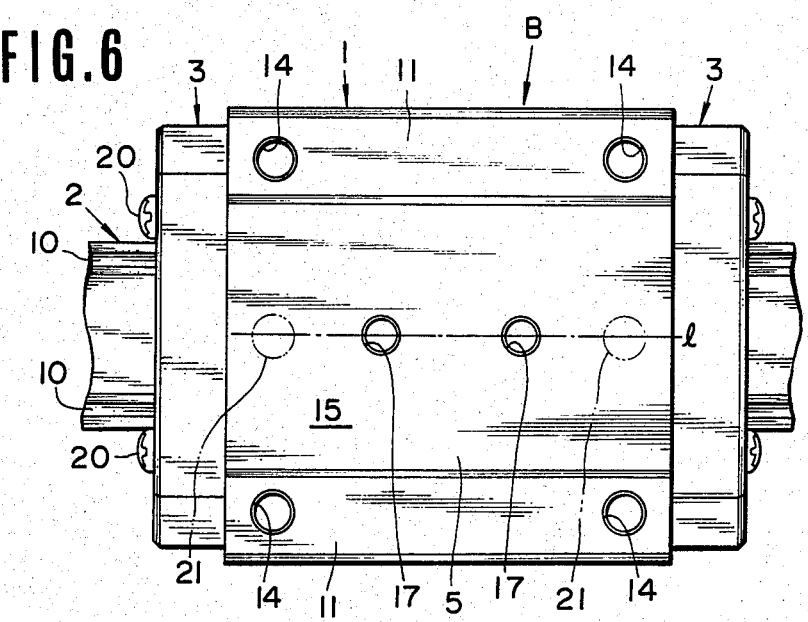
FIG. 6 is a plan view of the linear slide bearing shown in FIG. 3 with the mounting base thereof being removed.

FIGS. 1 thru 5 show a linear slide bearing B incorporating an embodiment of the clearance adjustment construction of the invention. The bearing B has a sliding block generally designated by a reference numeral 1. The sliding block 1 has a horizontal portion 5 and a pair of sleeve portions 6 which extend downwardly from both sides of the horizontal portion 5. The horizontal portion 5 and both sleeve portions 6 in cooperation define a substantially inverted C-shaped cross-section with a trapezoidal cavity or recess 7 which opens downwardly. As will be best seen from FIG. 4, each sleeve portion 6 is provided in the inner surface thereof, facing the recess 7, with a loaded ball groove 8 having a substantally semi-circular cross-section. A non-loaded ball bore 9a constituting a non-loaded ball passage 9 is formed in the solid portion of each sleeve portion 6 of the sliding block B so as to correspond to the loaded ball groove 8. The linear slide bearing B further has a track shaft 2 having a trapezoidal upper end portion adapted to be received in the recess 7 of the sliding block 1 keeping a predetermined clearance therebetween. The track shaft 2 has ball rolling grooves 10 having a substantially semi-circular cross-section corresponding to the loaded ball grooves 8 of the sliding block 1. The linear slide bearing B further has a pair of end covers 3 secured to both longitudinal ends of the sliding block 1. Each end cover 3 is provided on the inner surface thereof with a guide groove (not shown) which connects the opposing ends of the loaded ball groove 8 and the non-loaded ball bore 9a. Consequently, endless ball passages are formed by the loaded-ball grooves 8, non-loaded ball bores 9a and the guide grooves formed in both end covers 3. A multiplicity of balls are adapted to run in trains along respective endless ball passages. The balls, when running along the loaded ball passages formed by the loaded ball grooves 8 in the sliding block 1 and the ball rolling grooves 10 in the track shaft 2, carry the load applied to the sliding block 1 of the linear slide bearing.

As will be seen from FIG. 1 and FIGS. 4 through 6, the top surface of the sliding block 1 above the sleeve portions 6 are flattened to constitute a pair of mounting surfaces 11 which extend longitudinally of the sliding block 1. Threaded holes 14 are formed in both longitudinal end portions of each mounting surface 11. Tightening bolts 13 for securing and mounting a carrier 12 are adapted to be screwed into these threaded holes 13. The portion of the upper surface of the horizontal portion 5 between both mounting surfaces 11, as well as the corresponding portion of the lower surface of the carrier 12, is recessed as at 15 to provide a predetermined gap D between the sliding block 11 and the carrier 12.

In the illustrated embodiment, four holes are formed through the thickness of the carrier 12. These holes are arrayed along a line which, as will be clearly seen from FIG. 6, coincides with the center line "1" of the horizontal portion 11 between two mounting surfaces 11. These holes are adapted to receive clearance adjusting bolts 16. More specifically, among these four clearance adjusting bolts, the outer two bolts 16a are pressing bolts which contact the horizontal portion 5 along the center line "1" to press the horizontal portion 5 of the sliding block 1 downwardly, while the inner two bolts 16b are lifting bolts which are screwed to threaded holes 17 formed in the horizontal portion 5 along the center line "1" so as to be able to lift the horizontal portion 5 as desired.

In FIGS. 1 to 5, a reference numeral 18 denotes a bed the upper surface of which constitutes a reference plane which is used as the reference when the track shaft 2 of the linear slide bearing B is fixed to a machine such as an NC lathe. In FIGS. 3 to 6, a reference numeral 20 designates bolts for securing the end covers 3 to both longitudinal ends of the sliding block 1. A reference numeral 21 appearing in FIG. 6 designates the positions at which the pressing bolts 16a contact the upper surface of the horizontal portion 5 of the sliding block 1.

A description will be made hereinunder as to how the linear slide bearing B is mounted on a machine and as to how the clearance "d" between the sliding block 1 and the track shaft 2 is adjusted.

For mounting the linear slide bearing B, the track shaft 2 is secured to the reference plane 19, i.e. the upper surface, of the bed 18 of the machine. Then, the carrier 12 is mounted and levelled on the mounting surfaces 11 formed on the top of the horizontal portion 5 of the sliding block 1. Then, the fastening bolts 13 are tightened to fix the carrier 12.

Figure 7:
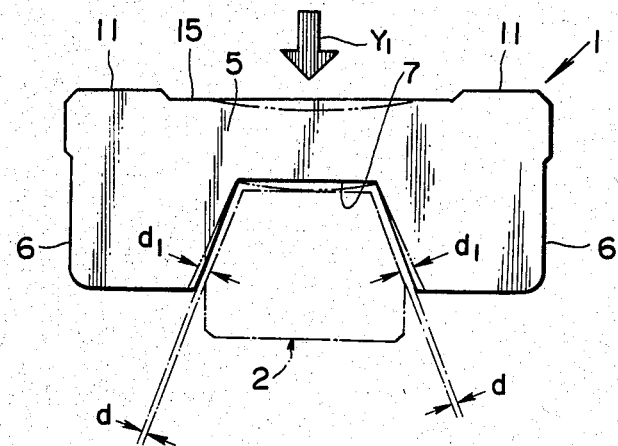
FIG. 7 is an illustration of a sliding block of the linear slide bearing, showing the state of elastic deflection of both horizontal end portions of the sliding block in a somewhat exaggerated manner.

Then, while observing and confirming the state of sliding movement of the sliding block 1, the pressing bolts 16a and the lifting bolts 16b are tightened to optimize the clearance "d" in a manner explained hereinbelow. Namely, as the pressing bolts 16a located on both longitudinal ends along the center line "1" are tightened, a force as indicated by arrow $Y_1$ in FIG. 7 is applied to the horizontal portion 5 of the sliding block 1 to cause an elastic deflection as shown by the two-dot-and-dash line in FIG. 7 at both longitudinal end portions of the horizontal portion 5, thereby to increase the distance between both sleeve portions 6 of the sliding block 1. Consequently, the distance "d" between the inner surface of each sleeve portion 6 of the sliding block 1 and opposing surface of track shaft 2 is increased to "$d_1$" at both longitudinal ends of the sliding block 1. On the other hand, the tightening of the lifting bolts 16b near the longitudinal center of the center line "1" produces a force which tends to lift the longitudinal central part of the horizontal portion 5 as indicated by arrow $Y_2$ in FIG. 8, thereby imparting an elastic deflection to the longitudinal central part of the horizntal portion 5 as indicated by the two-dot-and-dash line in FIG. 8. Consequently, at the longitudinal center portion of the sliding block 1, both sleeve portions 6 are deflected towards each other to reduce the distance there-from, so that the clearance "d" between the inner surface of each sleeve portion 6 and opposing surface of the track shaft 2 is decreased to "$d_2$" as shown in FIG. 8.

Figure 8:
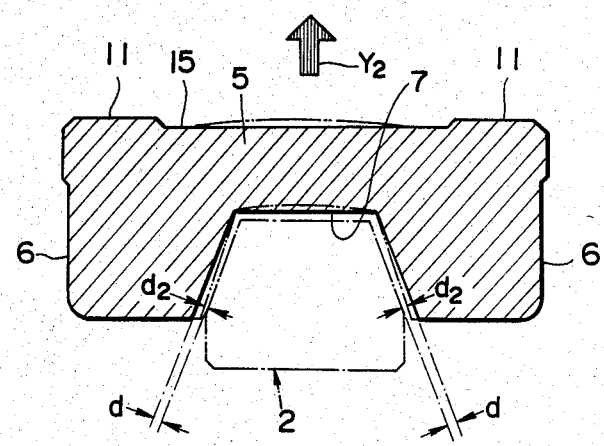
FIG. 8 is a sectional view of the sliding block showing the elastic deflection of the central portion of the sliding block in a somewhat exaggerated manner.

Thus, elastic deflection as shown in FIG. 7 is imparted to both end longitudinal end portions of the horizontal portion 5 of the sliding block 1, while an elastic deflection as illustrated in FIG. 8 is caused in the longitudinal central part of the same. In consequence, the clearance between the loaded ball grooves 8 formed in the inner surfaces of respective sleeve portions 6 of the sliding block 1 and corresponding ball rolling grooves 10 on the surfaces of the track shaft 2 is increased with respect to the ball diameter at both longitudinal end regions and decreased at the longitudinal central region. As a result of this adjustment, the balls residing in the longitudinal central region of the loaded ball passages are adequately preloaded, while the rolling of the balls are smoothed when the same roll from the non-loaded ball passages into the loaded passages and vice versa.

Figure 9:
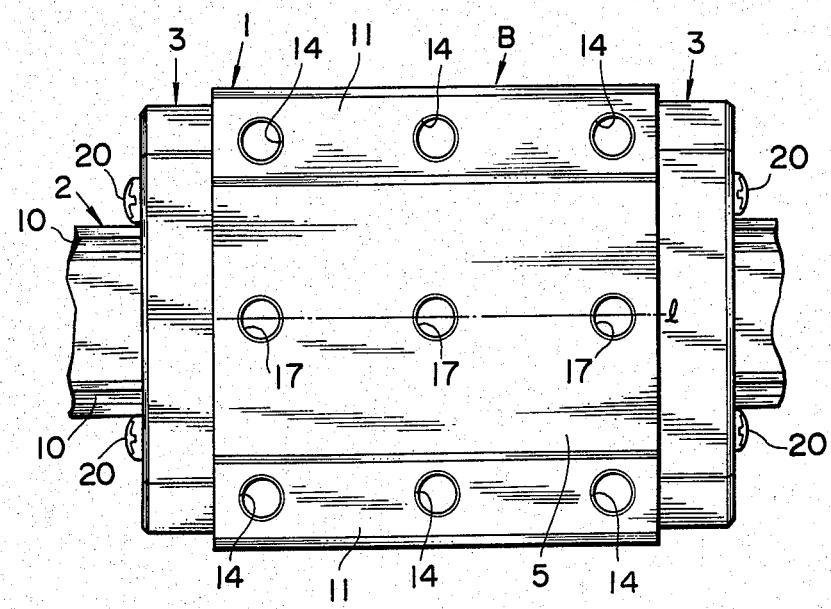
FIGS. 9 and 10 are plan views similar to FIG. 6, showing the modifications of the positions of fastening bolt and clearance adjusting bolt acting on the upper surface of the horizontal portion of the sliding block.
Figure 10:
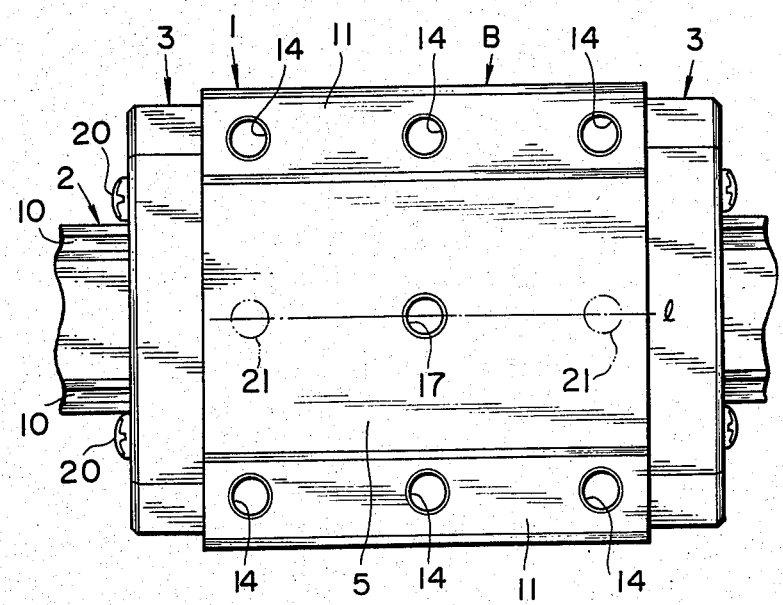

FIGS. 9 and 10 show modifications in which the kinds and positions of the fastening bolts 13 for fastening the carrier 12 to the sliding block 1, as well as those of the clearance adjusting bolts acting on the upper surface of the horizontal portion 5 of the sliding block 1, are changed from those of the embodiment described hereinbefore.

More specifically, in the modification shown in FIG. 9, three threaded holes 14 are provided in each mounting surface 11 formed on the top of the horizontal portion 5 of the sliding block 1. At the same time, three threaded holes 17 for clearance adjusting bolts are formed in the upper surface of the horizontal portion 5 of the sliding block 1, along the center line "1". The sliding block 1 is fabricated in such a manner as to provide a comparatively large clearance between the inner surfaces of both sleeve portions 6 and the opposing surfaces of the track shaft 2, so as not to effect any preloading of the balls. In this case, all of the three clearance adjusting bolts 16 are lifting bolts. As these bolts are screwed to the threaded holes 17, the sliding block 1 is elastically deflected substantially in the same manner as that described before. Consequently, the loaded balls residing in the central region of the loaded ball passages are adequately preloaded, while the running of the balls is smoothed at both longitudinal end regions of the loaded ball passages.

In the modification shown in FIG. 10, one threaded hole 14 for a lifting bolt 16b is formed on the center line "1" of the horizontal portion of the sliding block 1. This lifting bolt 16b is adapted to cooperate with two pressing bolts 16a which act on both longitudinal end portions of the horizontal portion 5 thereby to effect the adjustment of the clearance. Namely, in this modification, the sliding block 1 is fabricated beforehand to preload the balls between the loaded ball grooves 8 in the sliding block 1 and the ball rolling grooves 10 in the track shaft 2, when the sliding block 1 is mounted on the track shaft 2. Then, the pressing bolts 16a on both longitudinal ends of the horizontal portion 5 are tightened to decrease the initial preloading, while the lifting bolt 16b serves to maintain the initial preload when it is tightened.

Figure 11:
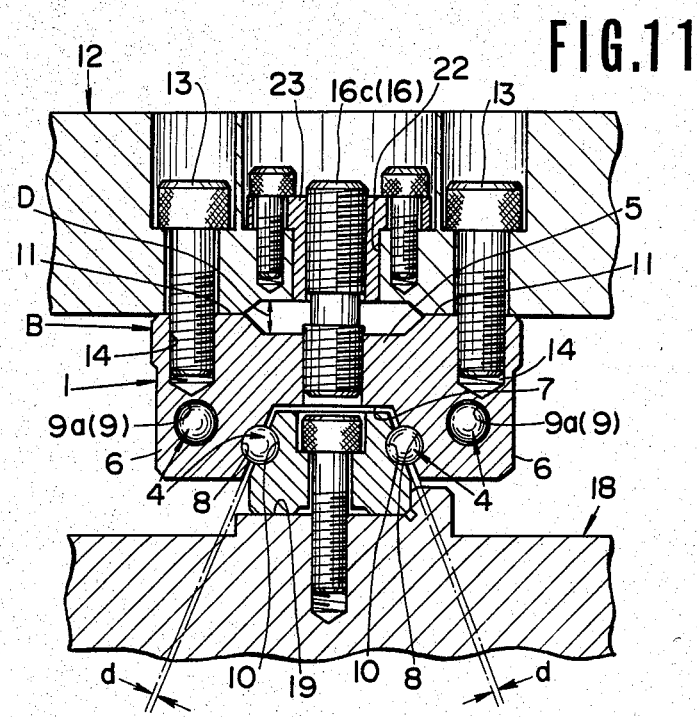
FIG. 11 is a sectional view similar to FIG. 4, showing a modification of the clearance adjusting bolt.

FIG. 11 shows a modification of the clearance adjusting bolt 16. The clearance adjusting bolt is constituted by a differential pitch bolt 16c which has an upper threaded portion and a lower threaded portion of different pitches of screw thread. This clearance adjusting bolt 16c is used in combination with a flanged nut 23 disposed in a hole 22 formed through the thickness of the carrier 12. By using this differential pitch bolt 16c as the clearance adjusting bolt 16, it is possible to apply either the downward pressing force or upward lifting force to the horizontal portion 5 of the sliding block 1, as desired. This arrangement, therefore, is quite suitable for effecting the adjustment of the clearance "d" between the inner surfaces of the sleeve portions 6 of the sliding block 1 and opposing surfaces of the track shaft 2. The number and positions of the clearance adjusting bolts 16 can be selected as desired in accordance with the length of the sliding block 1, and also in the case where the differential pitch bolt 16c is used as the clearance adjusting bolt 16.

Figure 12:
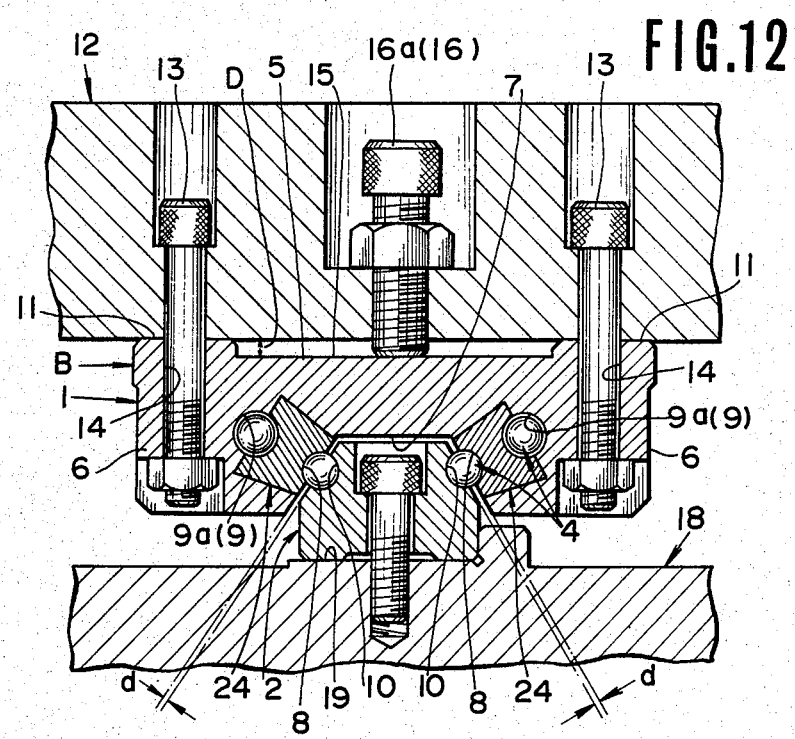
FIGS. 12 to 14 are sectional views similar to FIG. 4 or 5, showing different examples of the linear slide bearing to which the invention is applied.
Figure 13:
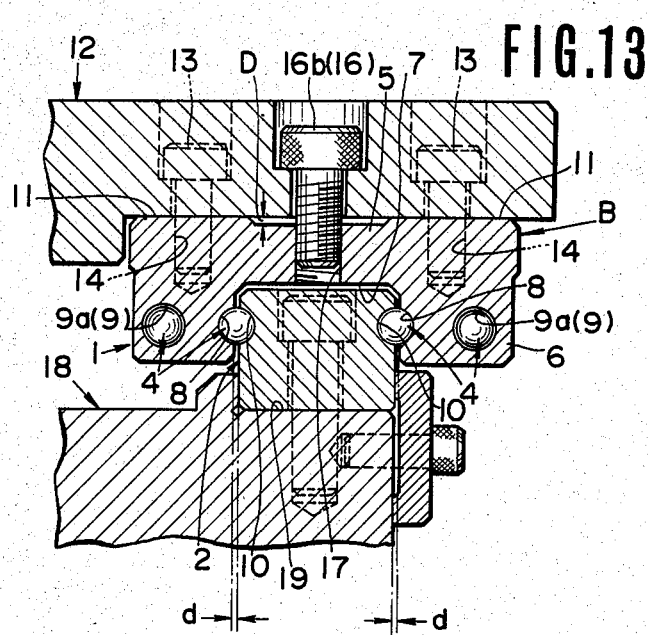
Figure 14:
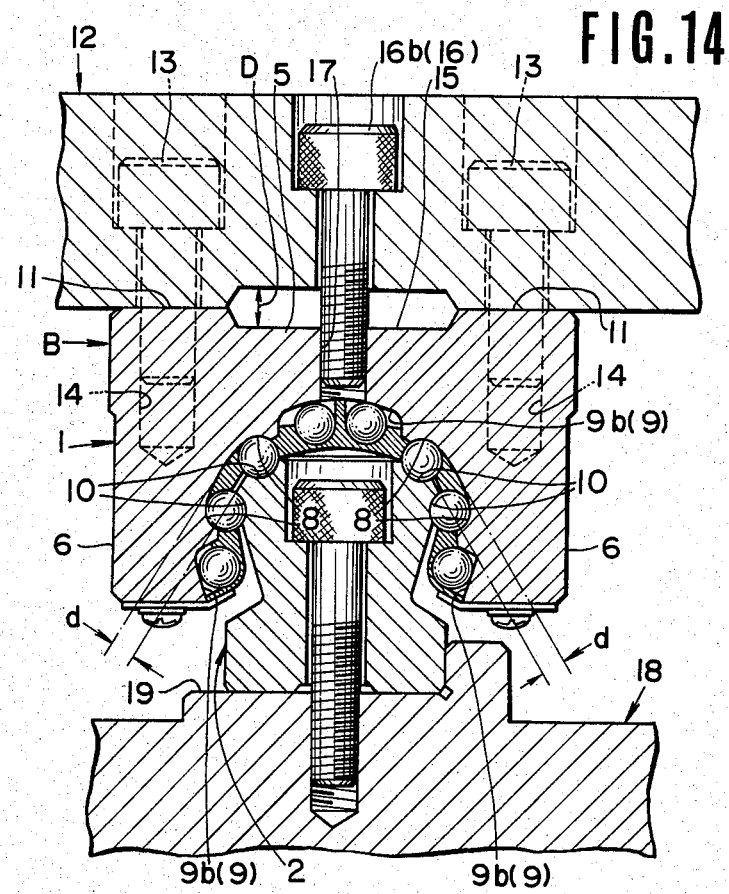

FIGS. 12 to 14 show different examples of the linear slide bearing B to which the invention is applied. More specifically, in the example of the linear slide bearing B shown in FIG. 12 this slide bearing has the sliding block 1 incorporating a pair of bearing races 24. In the example shown in FIG. 13, the recess 7 formed in the lower side of the sliding block 1 has a substantially rectangular cross-sectional shape. In the example of the linear slide bearing B shown in FIG. 14, the recess 7 formed in the lower side of the sliding block 1 has a substantialy semicircular cross-section. In this case, each of the loaded-ball grooves 8 formed longitudinally in the inner surface of the recess 7 has a cross-sectional shape which is a half of an elongated circle. At the same time, the passages 9 for the non-loaded balls are constituted by a deep longitudinal groove 9b formed in the inner surface of the recess 7. A ball retainer 25 is fitted in the recess 7. End covers (not shown) are secured to both longitudinal ends of the sliding block 1. Each end cover has two guide grooves formed in the inner surface thereof. Consequently, the loaded ball grooves 8 and the non-loaded ball passage 9, in combination with the guide groves formed in the end covers, constitute two endless ball passages. The track shaft 2 is provided at each shoulder portion thereof with a longitudinal protrusion or ridge in both side surfaces of which are formed ball rolling grooves 10. In the assembled state of the linear slide bearing, each ridge 26 is firmly clamped between two rows of balls 4 running in respective endless ball passages.

In this linear slide bearing also, it is possible to adjust the clearance "d" between the inner surfaces of the sleeve portions 6 of the sliding block 1 and opposing surfaces of the track shaft 2 by means of the clearance adjusting bolts, so as to adequately preload the balls in the central regions of the loaded ball passages and to smooth the running of the balls at both longitudinal end regions of the loaded ball passages.

As has been described, the present invention provides a construction for adjusting the clearance in linear slide bearing, the construction for adjusting the clearance comprises: a pair of mounting surfaces formed on the top of the horizontal portion of the sliding block above the sleeve portions and extending longitudinally of the sliding block; a carrier mounted on the mounting surfaces and fastened by a plurality of fastening bolts such that a gap is left between the upper surface of the central portion of the horizontal portion of the sliding block and opposing lower surface of the carrier; and at least one clearance adjusting bolt extending through the carrier and acting on the mid portion of the horizontal portion of the sliding block between the mounting surfaces; whereby the horizontal portion of the sliding block is elastically deflected as the clearance adjusting bolt is tightened, so that the clearance between the inner surface of each sleeve portion of the sliding block and the opposing surface of the track shaft is adjusted as a result of the elastic deflection of the horizontal portion.

With this arrangement, it is possible to adjust the clearance between the sliding block and the track shaft of the linear sliding bearing so as to adequately preload the loaded balls and to assure smooth running of the balls at both longitudinal end regions of the loaded ball passages, simply by tightening suitably the clearance adjusting bolts from the upper side of the carrier carrying a machine part, after installing the linear slide bearing in a machine such as an NC lathe.

Consequently, the invention eliminates the necessity for measures conventionally required for suitably preloading the balls, such as careful selection of the balls for attaining high uniformity of ball diameters, clearance adjustment effected through the sliding block which in such a case has to have a considerably large size, and crowning for providing greater width of loaded ball grooves in the sliding block at both longitudinal end portions than at the longitudinal central portion so as to smooth the rolling of the loaded balls.

For these reasons, the invention affords a remarkable reduction in the cost of production of the linear slide bearing of the type described.

Although the invention has been described by means of specific terms, it is to be noted here that the described embodiment is not exclusive and various changes can be further imparted without departing from the scope of the invention which is limited solely by the appended claims.

What is claimed is:

1. In a linear slide bearing having a sliding block having a horizontal portion and a pair of sleeve portions extending downwardly from both lateral sides of said horizontal portion, said horizontal portion and said sleeve portions cooperating in defining a recess which opens downwardly, each of said sleeve portions being provided in the inner surface thereof with a longitudinal loaded ball groove and a non-loaded ball passage corresponding to said loaded ball passage, a track shaft having an upper portion received in said recess of said sliding block such that a predetermined clearance is left between said sliding block and said track shaft, a pair of end covers secured to both longitudinal ends of said sliding block, each end cover being provided in the inner surface thereof with guide grooves so as to connect said loaded-ball grooves to corresponding non-loaded ball passages thereby to form endless ball passages, and a multiplicity of balls adapted to be circulated along said endless ball passages, said balls residing in the loaded ball passages constituted by said loaded ball grooves in said sliding block and said ball rolling grooves in said track shaft carrying the load applied to said sliding block, a construction for adjusting said clearance characterized by comprising: a pair of mounting surfaces formed on the top of said horizontal portion of said sliding block above said sleeve portions and extending longitudinally of said sliding block; a carrier mounted on said mounting surfaces and fastened by a plurality of fastening bolts such that a gap is left between the upper surface of the central portion of said horizontal portion of said sliding block and the opposing lower surface of said carrier; and at least one clearance adjusting bolt extending through said carrier and acting on the mid-portion of said horizontal portion of said sliding block between said supporting surfaces; whereby said horizontal portion of said sliding block is elastically deflected as said clearance adjusting bolt is tightened, so that the clearance between the inner surface of each sleeve portion of said sliding block and the opposing surface of said track shaft is adjusted as a result of the elastic deflection of said horizontal portion.

2. A construction for adjusting the clearance in a linear slide bearing according to claim 1, wherein said clearance adjusting bolt includes a plurality of lifting bolts screwed to clearance adjusting threaded holes formed in said mid-portion of said horizontal portion of said sliding block, so that said horizontal portion is lifted as said clearance adjusting bolts are tightened, whereby the clearance between the inner surface of each sleeve portion of said sliding block and the opposing surface of said track shaft is decreased to preload the balls accomodated by this clearance and carrying the load.

3. A construction for adjusting clearance in a linear slide bearing according to claim 1, wherein said clearance adjusting bolt includes a plurality of pressing bolts adapted to contact and press the central portion of said horizontal portion of said sliding block, whereby, as said pressing bolts are tightened, said horizontal portion of said sliding block is pressed and elastically deflected so as to increase the clearance between the inner surface of each sleeve portion of said sliding block and the opposing surface of said track shaft.

4. A construction for adjusting clearance in a linear slide bearing according to claim 1, wherein a plurality of said clearance adjusting bolts are arranged along the central portion of said horizontal portion of said sliding block, at least the outermost two clearance adjusting bolts being pressing bolts acting on both longitudinal end portions of said horizontal portion of said sliding block so as to press these longitudinal end portions downwardly, while other clearance adjusting bolts between said pressing bolts are lifting bolts adapted to lift the longitudinal central portion of said horizontal portion of said sliding block upwardly, whereby, as said clearance adjusting bolts are tightened, the clearance between the inner surface of each sleeve portion of said sliding block and the opposing surface of said track shaft is increased at both longitudinal end portions of said sliding block and decreased at the longitudinal central portion of said sliding block.

* * * * *